United States Patent
Noda et al.

(10) Patent No.: US 11,299,628 B2
(45) Date of Patent: Apr. 12, 2022

(54) ORGANOPOLYSILOXANE COMPOSITION

(71) Applicant: Shin-Etsu Chemical Co., Ltd., Tokyo (JP)

(72) Inventors: Daisuke Noda, Annaka (JP); Koji Sakuta, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 2 days.

(21) Appl. No.: 16/764,198

(22) PCT Filed: Nov. 6, 2018

(86) PCT No.: PCT/JP2018/041117
§ 371 (c)(1),
(2) Date: May 14, 2020

(87) PCT Pub. No.: WO2019/098084
PCT Pub. Date: May 23, 2019

(65) Prior Publication Data
US 2020/0392336 A1 Dec. 17, 2020

(30) Foreign Application Priority Data
Nov. 15, 2017 (JP) .............................. JP2017-219910

(51) Int. Cl.
*C08L 83/04* (2006.01)
*C08K 5/5475* (2006.01)
*C08G 77/20* (2006.01)
*C08G 77/12* (2006.01)

(52) U.S. Cl.
CPC .............. *C08L 83/04* (2013.01); *C08G 77/12* (2013.01); *C08G 77/20* (2013.01); *C08K 5/5475* (2013.01); *C08L 2205/025* (2013.01); *C08L 2205/03* (2013.01)

(58) Field of Classification Search
CPC ...................................... C08L 83/04
See application file for complete search history.

(56) References Cited

U.S. PATENT DOCUMENTS

| | | | | |
|---|---|---|---|---|
| 2,975,204 A | * | 3/1961 | Pepe ...................... | C07F 7/1804 556/417 |
| 4,618,639 A | * | 10/1986 | Takahashi ............... | C08L 83/08 524/262 |
| 5,082,894 A | | 1/1992 | VanWert et al. | |
| 5,548,006 A | | 8/1996 | Hirabayashi et al. | |
| 5,629,387 A | | 5/1997 | Frances et al. | |
| 6,235,861 B1 | * | 5/2001 | Kishi ...................... | C08K 5/315 528/12 |
| 6,699,956 B2 | * | 3/2004 | Kudo ........................ | C08F 8/42 528/15 |
| 2008/0227938 A1 | | 9/2008 | Kimura et al. | |

FOREIGN PATENT DOCUMENTS

| | | |
|---|---|---|
| EP | 3 406 616 A1 | 11/2018 |
| JP | 1-210461 A | 8/1989 |
| JP | 5-247348 A | 9/1993 |
| JP | 6-248084 A | 9/1994 |
| JP | 6-329917 A | 11/1994 |
| JP | 7-292255 A | 11/1995 |
| JP | 8-143777 A | 6/1996 |
| JP | 2000-178210 A | 6/2000 |
| JP | 2000-328042 A | 11/2000 |
| JP | 3528969 B2 | 5/2004 |
| JP | 2008-255343 A | 10/2008 |
| JP | 2010-18754 A | 1/2010 |
| WO | WO 2017/126562 A1 | 7/2017 |
| WO | WO 2018/159599 A1 | 9/2018 |

OTHER PUBLICATIONS

International Search Report (PCT/ISA/210) issued in PCT/JP2018/041117, dated Feb. 5, 2019.
Kishi et al., "Development and Application of Latent Catalysts for Hydrosilylation System. 1. Control of Activity of Platinum Catalyst by Isocyanide," Macromolecules, vol. 31, No. 26, 1998, pp. 9392-9394.
Kishi et al., "Development and application of latent hydrosilylation cataiyst [6]: control of activity of platinum catalyst by isocyanide derivatives on the crosslinking of silicone resin via hydrosilylation," International Journal of Adhesion & Adhesives, vol. 20, 2000, pp. 253-256.
Written Opinion of the International Searching Authority (PCT/ISA/237) issued in PCT/JP2018/041117, dated Feb. 5, 2019.

* cited by examiner

Primary Examiner — Margaret G Moore
(74) Attorney, Agent, or Firm — Birch, Stewart, Kolasch & Birch, LLP

(57) ABSTRACT

Provided is an organopolysiloxane composition, comprising: (A) an organopolysiloxane having at least two silicon atom-bonded alkenyl groups in each molecule, (B) an organohydrogenpolysiloxane having at least two silicon atom-bonded hydrogen atoms in each molecule, (C) a platinum catalyst, and (D) a specific isocyanide compound.

9 Claims, No Drawings

ORGANOPOLYSILOXANE COMPOSITION

TECHNICAL FIELD

This invention relates to an organopolysiloxane composition and more particularly, to an organopolysiloxane composition having an isocyanide compound added thereto.

BACKGROUND ART

Through hydrosilylation reaction which is an addition reaction between an unsaturated group-containing compound and a Si—H bond-containing compound, a variety of silicone materials are industrially produced in the presence of platinum catalysts. Particularly when an organopolysiloxane having alkenyl group and an organopolysiloxane having Si—H bond are used, crosslinking takes place through the addition reaction, curing into silicone materials having inherent properties.

These silicone materials are classified into one pack and two pack types depending on a particular application. When a cured product is obtained through addition reaction, reaction starts immediately after addition of a platinum catalyst because the platinum catalyst is highly active. Thus a reaction inhibitor or regulator to the platinum catalyst is often added, for adjusting the cure rate and pot-life of the system for a particular application. Suitable reaction inhibitors include, for example, acetylene compounds (Patent Document 1), acetylene alcohol compounds (Patent Documents 2 to 5), organic nitrogen compounds such as diamine, cyclic azo ether and imino compounds, organic sulfur compounds such as thiophene and thioether compounds (Patent Documents 6 to 8), and other compounds (Patent Document 9).

It is known from Patent Document 8 and Non-Patent Documents 1 and 2 that the isocyanide or isonitrile compounds exert an inhibitory effect in small amounts as compared with other reaction inhibitors. However, compounds having an isocyanide group including the compounds described therein are generally volatile materials with disgusting odor, raising the problem that disgusting odor is given off during or after curing. The isocyanide compounds are thus inadequate as the additive to silicone materials in the intended application.

It is desired to control the reaction rate of any one of various organopolysiloxane compositions in accordance with a particular purpose. However, reaction control is difficult when the amount of an isocyanide compound added is small relative to platinum. Excessive addition is thus necessary. This approach is not practical because the isocyanide compound gives off disgusting odor even in trace amounts.

Patent Document 10 discloses a novel silicone-modified isocyanide compound as the ligand for hydrosilylation reaction catalysts. This compound is used in combination with metals other than platinum, for the purpose of improving the catalyst activity. No study is made on the compound as an inhibitor to the platinum catalyst.

PRIOR ART DOCUMENTS

Patent Documents

Patent Document 1: JP-A H06-248084
Patent Document 2: JP-A 2010-018754
Patent Document 3: JP-A 2000-178210
Patent Document 4: JP-A H06-329917
Patent Document 5: JP-A H05-247348
Patent Document 6: JP-A H07-292255
Patent Document 7: JP-A H08-143777
Patent Document 8: JP 3528969
Patent Document 9: JP-A 2008-255343
Patent Document 10: WO 2017/126562
Non-Patent Document 1: T. Endo, et al., Macromolecules, 1998, 31, p 9392
Non-Patent Document 2: T. Endo, et al., Int. J. Adhesion and Adhesives, 2000, 20, p 253

SUMMARY OF INVENTION

Technical Problem

An object of the invention, which has been made under the above-mentioned circumstances, is to provide an organopolysiloxane composition comprising an isocyanide compound capable of controlling platinum catalyst-aided reaction in a small amount, the isocyanide compound giving off little foul smell and being readily dissolvable in the composition.

Solution to Problem

Making extensive investigations to attain the above object, the inventors have found that the above and other objects are attained using a specific isocyanide compound. The invention is predicated on this finding.

The invention provides an organopolysiloxane composition as defined below.

1. An organopolysiloxane composition comprising:
   (A) an organopolysiloxane having at least two silicon-bonded alkenyl groups per molecule,
   (B) an organohydrogenpolysiloxane having at least two silicon-bonded hydrogen atoms per molecule,
   (C) a platinum hydrosilylation catalyst, and
   (D) a compound having the formula (1-1) or (1-2):

$$R^1-Si(R^1)_a\{[X-Si(R^1)_2]_b-R^1\}_c \quad (1\text{-}1)$$

$$R^1-Si(R^1)_a\{(Z_i)\}_c \quad (1\text{-}2)$$

wherein $R^1$ is each independently a monovalent organic group selected from an optionally substituted $C_1$-$C_{30}$ monovalent organic group which may be separated by at least one atom selected from oxygen, nitrogen, sulfur and phosphorus, and an organic group having the formula (2):

$$-Y-NC \quad (2)$$

wherein Y is an optionally substituted $C_1$-$C_{30}$ divalent organic group which may be separated by at least one atom selected from oxygen, nitrogen, sulfur and phosphorus, one to three of all groups $R^1$ being an organic group of formula (2), X is each independently an oxygen atom, or an optionally substituted $C_1$-$C_3$ divalent organic group which may be separated by at least one atom selected from oxygen, nitrogen, sulfur and phosphorus, two groups $R^1$ may bond together to form a crosslinking group Z to form a cyclic structure, wherein Z has the same meaning as X, a is an integer of 0 to 3, c is an integer of 0 to 3, a+c is 3, b is an integer of 1 to 300, $Z_i$ is a group of the formula:

$$-X-Si(R^1)_j(Z_{i+1})_{(3-j)}$$

wherein i indicative of a hierarchy is an integer of 1 to 10, j is an integer of 0 to 3, j associated with at least one of all hierarchies is 0 or 1, the lowest hierarchy is j=3.

2. The organopolysiloxane composition of 1 wherein component (A) is an organopolysiloxane having the average compositional formula (3):

$$R^2_d R^3_e SiO_{(4-d-e)/2} \quad (3)$$

wherein $R^2$ is each independently an alkenyl group, $R^3$ is each independently a silicon-bonded organic group other than the alkenyl group, d and e are numbers in the range: $0<d\leq3$, $0\leq e<3$, and $0<d+e\leq3$, and selected such that at least two alkenyl groups $R^2$ are contained per molecule, and component (B) is an organohydrogenpolysiloxane having the average compositional formula (4):

$$R^4_g H_h SiO_{(4-g-h)/2} \quad (4)$$

wherein $R^4$ is each independently an organic group other than silicon-bonded hydrogen, g and h are numbers in the range: $0<g<3$, $0<h<3$, and $0<g+h\leq3$, and selected such that at least two silicon-bonded hydrogen atoms are contained per molecule.

3. The organopolysiloxane composition of 1 or 2 wherein in formula (1-1), a is 0, 1 or 2.

4. The organopolysiloxane composition of any one of 1 to 3 wherein in formula (1-1) or (1-2), one of all groups $R^1$ is an organic group of formula (2).

5. The organopolysiloxane composition of any one of 1 to 4 wherein in formula (1-1), the crosslinking group Z formed by two groups $R^1$, taken together, is oxygen.

6. The organopolysiloxane composition of any one of 1 to 5 wherein in formula (1-1) or (1-2), X is oxygen.

7. The organopolysiloxane composition of any one of 1 to 6 wherein in formula (2), Y is a $C_1$-$C_{30}$ divalent hydrocarbon group.

8. The organopolysiloxane composition of any one of 1 to 7 wherein component (D) is present in an amount to give 2 to 20 equivalents of the group of formula (2) per platinum atom in component (C).

Advantageous Effects of Invention

The organopolysiloxane composition of the invention contains a specific isocyanide compound, which has a high boiling point due to the organic silicon skeleton and gives off little a foul smell inherent to isocyanide group, as compared with the isocyanide compounds exemplified in Patent Document 8 and Non-Patent Documents 1 and 2. Due to the organic silicon skeleton, the compound is liquid, easy to handle, and readily dissolvable in the composition. The cure rate and pot-life of the organopolysiloxane composition can be controlled by adjusting the amount of the isocyanide compound added in accordance with a particular application of the composition. The isocyanide compound is capable of controlling platinum catalyst-aided reaction in a small amount as compared with commonly used acetylene alcohol base inhibitors, and the composition is quite useful.

DESCRIPTION OF EMBODIMENTS

Now the invention is described in detail.
[Component (A)]
Component (A) is an organopolysiloxane having at least two silicon-bonded alkenyl groups per molecule, which may be used alone or in suitable combination of two or more.

Specifically, it is an organopolysiloxane having the average compositional formula (3).

$$R^2_d R^3_e SiO_{(4-d-e)/2} \quad (3)$$

Herein $R^2$ is each independently an alkenyl group, $R^3$ is a silicon-bonded organic group other than the alkenyl group, d and e are numbers in the range: $0<d\leq3$, $0\leq e<3$, and $0<d+e\leq3$, and selected such that at least two alkenyl groups $R^2$ are contained per molecule.

Examples of $R^2$ include vinyl, allyl, n-1-butenyl, n-1-pentenyl, and n-1-hexenyl, with vinyl being preferred. In component (A), the alkenyl group may be attached to the end and/or a side chain of the molecular chain.

$R^3$ which may be the same or different is a silicon-bonded organic group other than the alkenyl group $R^2$. For example, $R^3$ is selected from optionally substituted $C_1$-$C_{30}$ monovalent hydrocarbon groups free of aliphatic unsaturation, and hydroxyl groups, preferably $C_1$-$C_{10}$ monovalent hydrocarbon groups. Suitable monovalent hydrocarbon groups include alkyl, aryl and aralkyl groups. Examples include straight or branched alkyl groups such as methyl, ethyl, n-propyl, isopropyl, n-butyl, isobutyl, s-butyl, t-butyl, n-pentyl, n-hexyl, n-heptyl, n-octyl, 2-ethylhexyl, n-nonyl and n-decyl, cycloalkyl groups such as cyclohexyl, aryl groups such as phenyl and naphthyl, and aralkyl groups such as benzyl. Methyl or phenyl is preferred.

The subscripts d and e are numbers in the range: $0<d\leq3$, $0\leq e<3$, and $0<d+e\leq3$, and selected such that at least two alkenyl groups $R^2$ are contained per molecule. Component (A) may have a linear, branched or cyclic molecular structure.

Examples of the organopolysiloxane having average compositional formula (3) include, for linear structure, dimethylvinylsiloxy-endcapped dimethylpolysiloxane, dimethylvinylsiloxy-endcapped methylvinylpolysiloxane, dimethylvinylsiloxy-endcapped dimethylsiloxane/diphenylsiloxane copolymers, dimethylvinylsiloxy-endcapped dimethylsiloxane/methylvinylsiloxane copolymers, dimethylvinylsiloxy-endcapped dimethylsiloxane/methylvinylsiloxane/diphenylsiloxane copolymers, trimethylsiloxy-endcapped methylvinylpolysiloxane, trimethylsiloxy-endcapped dimethylsiloxane/methylvinylsiloxane copolymers, trimethylsiloxy-endcapped dimethylsiloxane/diphenylsiloxane/methylvinylsiloxane copolymers, and hydroxy-endcapped dimethylsiloxane/methylvinylsiloxane copolymers. As used herein, the term "endcapped" encompasses one end and both ends.

Examples of the organopolysiloxane of branched structure include the foregoing linear polysiloxanes which partially contain at least one repeating siloxane unit of $R^2_f R^3_{(1-f)} SiO_{3/2}$ and/or $SiO_{4/2}$, wherein f is 0 or 1. Examples of the organopolysiloxane of cyclic structure include 2,4,6-trimethyl-2,4,6-trivinylcyclotrisiloxane, 2,4,6-trimethyl-2,4,6-triallylcyclotrisiloxane, and 2,4,6,8-tetramethyl-2,4,6,8-tetravinylcyclotetrasiloxane. Also included are the above-exemplified organopolysiloxanes in which some or all of the methyl groups are replaced by alkyl groups such as ethyl and propyl, or aryl groups such as phenyl.

Any appropriate component (A) is selected depending on the desired application or physical properties of a cured product obtained by heating or otherwise treating the organopolysiloxane composition. From the standpoint of handling or working of the composition, component (A) should preferably have a viscosity at 25° C. of 10 to 500,000 mm²/s, more preferably 300 to 100,000 mm²/s. As used herein, the kinematic viscosity is measured by an Ostwald viscometer (the same holds true, hereinafter).
[Component (B)]
Component (B) is an organohydrogenpolysiloxane having at least two silicon-bonded hydrogen atoms per molecule, which may be used alone or in suitable combination of two or more. Specifically, component (B) has the average compositional formula (4).

$$R^4_g H_h SiO_{(4-g-h)/2} \quad (4)$$

Herein $R^4$ is each independently an organic group other than silicon-bonded hydrogen, g and h are numbers in the range: $0 \leq g < 3$, $0 < h < 3$, and $0 < g+h \leq 3$, and selected such that at least two silicon-bonded hydrogen atoms are contained per molecule.

The silicon-bonded hydrogen atom may be attached to the end and/or a side chain of the molecular chain.

$R^4$ which may be the same or different is an organic group other than silicon-bonded hydrogen. Examples include optionally substituted $C_1$-$C_{30}$ monovalent hydrocarbon groups free of aliphatic unsaturation, especially $C_1$-$C_{10}$ monovalent hydrocarbon groups free of aliphatic unsaturation. Illustrative examples of $R^4$ are the same as exemplified for $R^3$.

The subscripts g and h are numbers in the range: $0 \leq g < 3$, $0 < h < 3$, and $0 < g+h \leq 3$, and selected such that at least two silicon-bonded hydrogen atoms are contained per molecule.

Examples of the organohydrogenpolysiloxane having average compositional formula (4) include, for linear structure, dimethylhydrogensiloxy-endcapped dimethylpolysiloxane, dimethylhydrogensiloxy-endcapped methylhydrogenpolysiloxane, dimethylhydrogensiloxy-endcapped dimethylsiloxane/diphenylsiloxane copolymers, dimethylhydrogensiloxy-endcapped dimethylsiloxane/methylhydrogensiloxane copolymers, dimethylhydrogensiloxy-endcapped dimethylsiloxane/methylhydrogensiloxane/diphenylsiloxane copolymers, trimethylsiloxy-endcapped methylhydrogenpolysiloxane, trimethylsiloxy-endcapped dimethylsiloxane/methylhydrogensiloxane copolymers, trimethylsiloxy-endcapped dimethylsiloxane/diphenylsiloxane/methylhydrogensiloxane copolymers, and hydroxy-endcapped dimethylsiloxane/methylhydrogensiloxane copolymers. Examples of the organohydrogenpolysiloxane of branched structure include the foregoing linear polysiloxanes which partially contain at least one repeating siloxane unit of $R^4SiO_{1.5}$ and/or $HSiO_{1.5}$ and/or $SiO_2$. Examples of the organohydrogenpolysiloxane of cyclic structure include 2,4,6-trimethylcyclotrisiloxane, 2,4,6,8-tetramethylcyclotetrasiloxane, and 2,4,6,8,10-pentamethylcyclopentasiloxane. Also included are the above-exemplified organohydrogenpolysiloxanes in which some or all of the methyl groups are replaced by alkyl groups such as ethyl and propyl, or aryl groups such as phenyl. A mixture of two or more of the above-exemplified organohydrogenpolysiloxanes is also acceptable. Notably, the term "endcapped" encompasses one end and both ends.

Any appropriate component (B) is selected depending on the desired application or physical properties of a cured product obtained by heating or otherwise treating the organopolysiloxane composition. From the standpoint of handling or working of the composition, component (B) should preferably have a viscosity at 25° C. of 0.1 to 10,000 mm²/s, more preferably 5 to 500 mm²/s.

Component (B) is blended in an amount to give preferably 0.1 to 10 moles, more preferably 0.4 to 5 moles, even more preferably 0.5 to 4 moles of Si—H groups in component (B) per mole of alkenyl groups in component (A).

[Component (C)]

Component (C) is a platinum hydrosilylation catalyst having activity to hydrosilylation reaction. As the platinum hydrosilylation catalyst, any well-known catalysts may be used, for example, chloroplatinic acid, alcohol-modified chloroplatinic acids, and platinum-olefin complexes. Inter alia, complexes of platinum with siloxanes having a plurality of alkenyl groups are preferred from the standpoint of catalyst activity. Although the amount of component (C) is not particularly limited, it is preferred from the standpoints of cure rate and cost that the amount be in the range of 1 to 1,000 ppm based on the total weight of components (A) and (B).

[Component (D)]

Component (D) is a compound having the formula (1-1) or (1-2).

$$R^1—Si(R^1)_a\{[X—Si(R^1)_2]_b—R^1\}_c \quad (1\text{-}1)$$

$$R^1—Si(R^1)_a\{(Z_i)\}_c \quad (1\text{-}2)$$

Herein $R^1$ is each independently a monovalent organic group selected from an optionally substituted $C_1$-$C_{30}$ monovalent organic group which may be separated by at least one atom selected from oxygen, nitrogen, sulfur and phosphorus, and an organic group having the formula (2):

$$—Y—NC \quad (2)$$

wherein Y is a substituted or unsubstituted $C_1$-$C_{30}$ divalent organic group which may be separated by at least one atom selected from oxygen, nitrogen, sulfur and phosphorus, one to three of all groups $R^1$ being an organic group of formula (2), X is each independently an oxygen atom, or a substituted or unsubstituted $C_1$-$C_{30}$ divalent organic group which may be separated by at least one atom selected from oxygen, nitrogen, sulfur and phosphorus, two groups $R^1$ may bond together to form a crosslinking group Z to form a cyclic structure, wherein Z has the same meaning as X, a is an integer of 0 to 3, c is an integer of 0 to 3, a+c is 3, b is an integer of 1 to 300, $Z_i$ is a group of the formula:

$$—X—Si(R^1)_j(Z_{i+1})_{(3-j)}$$

wherein i indicative of a hierarchy is an integer of 1 to 10, j is an integer of 0 to 3, j associated with at least one of all hierarchies is 0 or 1, the lowest hierarchy is j=3. These compounds may be used alone or in suitable combination of two or more.

Below, formulae (1-1) and (1-2) are collectively represented as formula (1).

In formula (1), $R^1$ is each independently a monovalent organic group selected from an optionally substituted $C_1$-$C_{30}$ monovalent organic group which may be separated by at least one atom selected from oxygen, nitrogen, sulfur and phosphorus, and an organic group having formula (2).

The $C_1$-$C_{30}$ monovalent organic groups are preferably $C_1$-$C_{30}$ monovalent hydrocarbon groups or organooxy groups, though not limited thereto. Suitable monovalent hydrocarbon groups include alkyl, alkenyl, alkynyl, aryl and aralkyl groups.

The alkyl groups may be straight, branched or cyclic, preferably $C_1$-$C_2$ alkyl groups, more preferably $C_1$-$C_{10}$ alkyl groups. Examples include straight or branched alkyl groups such as methyl, ethyl, n-propyl, isopropyl, n-butyl, isobutyl, s-butyl, t-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, and n-eicosanyl; and cycloalkyl groups such as cyclopropyl, cyclobutyl, cyclopentyl, cyclohexyl, cycloheptyl, cyclooctyl, cyclononyl, norbornyl and adamantyl.

The alkenyl groups are preferably $C_2$-$C_{20}$ alkenyl groups. Examples include ethenyl (or vinyl), n-1-propenyl (or allyl), n-2-propenyl, 1-methylethenyl, n-1-butenyl, n-2-butenyl, n-3-butenyl, 2-methyl-1-propenyl, 2-methyl-2-propenyl, 1-ethylethenyl, 1-methyl-1-propenyl, 1-methyl-2-propenyl, n-1-pentenyl, n-1-hexenyl, n-1-decenyl, and n-1-eicosenyl.

The alkynyl groups are preferably $C_2$-$C_{20}$ alkynyl groups. Examples include ethynyl, n-1-propynyl, n-2-propynyl, n-1-butynyl, n-2-butynyl, n-3-butynyl, 1-methyl-2-propynyl, n-1-pentynyl, n-2-pentynyl, n-3-pentynyl, n-4-pentynyl, 1-methyl-n-butynyl, 2-methyl-n-butynyl, 3-methyl-n-butynyl, 1,1-dimethyl-n-propynyl, n-1-hexynyl, n-1-decynyl, n-1-pentadecynyl, and n-1-eicosynyl.

The aryl groups are preferably $C_6$-$C_{30}$ aryl groups, more preferably $C_6$-$C_{20}$ aryl groups. Examples include phenyl, 1-naphthyl, 2-naphthyl, anthryl, phenanthryl, o-biphenylyl, m-biphenylyl, p-biphenylyl, tolyl, 2,6-dimethylphenyl, 2,6-diisopropylphenyl, and mesityl.

The aralkyl groups are preferably $C_7$-$C_{30}$ aralkyl groups, more preferably $C_7$-$C_{20}$ aralkyl groups. Examples include benzyl, phenylethyl, phenylpropyl, naphthylmethyl, naphthylethyl, and naphthylpropyl.

The organooxy groups are preferably $C_1$-$C_{10}$ organooxy groups. Examples include straight or branched alkoxy groups such as methoxy, ethoxy, n-propoxy, isopropoxy, n-butoxy, isobutoxy, s-butoxy, t-butoxy, n-pentyloxy, n-hexyloxy, 2-ethylhexyloxy, n-heptyloxy, and n-octyloxy; cycloalkoxy groups such as cyclopropoxy, cyclobutoxy, cyclopentyloxy, cyclohexyloxy, norbornyloxy, and adamantyloxy; aryloxy groups such as phenoxy; and aralkyloxy groups such as benzoxy.

Of these, preference is given to alkyl groups such as methyl, ethyl, n-propyl, isopropyl, n-butyl and t-butyl, organooxy groups such as methoxy, ethoxy, n-propoxy, isopropoxy, n-butoxy, phenoxy and benzoxy, and aryl groups such as phenyl.

The foregoing alkyl, alkenyl, alkynyl, aryl, aralkyl, and organooxy groups may be substituted and separated by at least one atom selected from oxygen, nitrogen, sulfur and phosphorus. Examples of the substituent on $R^1$ include halogen atoms such as fluorine, chlorine, bromine and iodine, alkoxy groups such as methoxy, ethoxy and propoxy, and amino groups such as dialkylamino.

X is each independently an oxygen atom, or an optionally substituted $C_1$-$C_3$ divalent organic group which may be separated by at least one atom selected from oxygen, nitrogen, sulfur and phosphorus. Inter alia, oxygen is preferred.

The $C_1$-$C_{30}$ divalent organic groups are preferably, but not limited to, $C_1$-$C_{30}$ divalent hydrocarbon groups which may be straight, branched or cyclic. Suitable divalent hydrocarbon groups include alkylene, arylene and aralkylene groups.

The alkylene groups, which may be straight, branched or cyclic, are preferably $C_1$-$C_{20}$ alkylene groups, more preferably $C_1$-$C_{10}$ alkylene groups. Examples include straight or branched alkylene groups such as methylene, ethylene, propylene, trimethylene, n-butylene, isobutylene, s-butylene, n-octylene, 2-ethylhexylene, n-decylene, n-undecylene, n-dodecylene, n-tridecylene, n-tetradecylene, n-pentadecylene, n-hexadecylene, n-heptadecylene, n-octadecylene, n-nonadecylene, and n-eicosanylene; and cycloalkylene groups such as 1,4-cyclohexylene.

The arylene groups are preferably $C_6$-$C_{30}$ arylene groups, more preferably $C_6$-$C_{20}$ arylene groups. Examples include o-phenylene, m-phenylene, p-phenylene, 1,2-naphthylene, 1,8-naphthylene, 2,3-naphthylene, and 4,4'-biphenylene.

The aralkylene groups are preferably $C_7$-$C_{30}$ aralkylene groups, more preferably $C_7$-$C_{20}$ aralkylene groups. Examples include —$(CH_2)_k$—Ar—, —Ar—$(CH_2)_k$—, and —$(CH_2)_k$—Ar—$(CH_2)_k$— wherein Ar is a $C_6$-$C_{20}$ arylene group, and k is independently an integer of 1 to 10.

Examples of the substituent on X include halogen atoms such as fluorine, chlorine, bromine and iodine, alkoxy groups such as methoxy, ethoxy and propoxy, and amino groups such as dialkylamino.

In formula (1), one to three of all groups $R^1$ are organic groups of formula (2). The corresponding isocyanide compound may be a single compound or a plurality of different compounds. Preferably, one or two of all groups $R^1$ are isocyanide-containing organic groups of formula (2). More preferably, one of all groups $R^1$ is an isocyanide-containing organic group of formula (2).

In formula (2), Y is an optionally substituted $C_1$-$C_{30}$ divalent organic group which may be separated by at least one atom selected from oxygen, nitrogen, sulfur and phosphorus. The $C_1$-$C_{30}$ divalent organic groups are preferably those exemplified above for X, but not limited thereto. Also examples of the substituent on Y are as exemplified above. Y is preferably a $C_1$-$C_{30}$ divalent hydrocarbon group, more preferably $C_1$-$C_{10}$ divalent hydrocarbon group, which may be straight, branched or cyclic.

Also, two groups $R^1$ may bond together to form a crosslinking group Z to form a cyclic structure. Z is as defined for X, specifically an oxygen atom, or an optionally substituted $C_1$-$C_{30}$ divalent organic group which may be separated by at least one atom selected from oxygen, nitrogen, sulfur and phosphorus. Preferably Z is oxygen.

The subscript "a" is an integer of 0 to 3, c is an integer of 0 to 3, and a+c is 3. Formula (1) wherein a=3 represents tetraorganosilanes, whereas formula (1) wherein a=0, 1 or 2 represents organo(poly)siloxane compounds having a siloxane group in the molecule. In the case of a=0, 1 or 2, the monovalent organic group of formula (2) may be attached to either an end or a side chain of the organo(poly)siloxane skeleton. As used herein, the term (poly)siloxane refers collectively to siloxane compounds having one siloxy group and polysiloxane compounds having two or more siloxy groups. The subscript b is an integer of 1 to 300, preferably 1 to 10.

In formula (1-1), the remaining groups other than the monovalent organic group having formula (2) are silyl groups or (poly)organosiloxane groups. Examples include trimethylsilyl, triethylsilyl, phenyldimethylsilyl, trimethoxysilyl, triethoxysilyl, pentamethyldisiloxy, bistrimethyloxymethylsilyl, tristrimethylsiloxysilyl, polydimethylsiloxy groups of the formula: –$Si(Me)_2\{OSi(Me)_2\}_{(b-1)}OSiMe_3$ wherein b is as defined above, (poly)dimethylsiloxy groups of the formula: —$Si(Me)_2\{OSi(Me)_2\}_{(b-1)}OSiMe_2nBu$ wherein b is as defined above, and (poly)dimethylsiloxy groups of the formula: —$Si(Me)_2\{OSi(Me)_2\}_{(b-1)}OSiMe_2$-. When two groups $R^1$ bond together to forma crosslinking group Z to form a cyclic structure, 1,3,5,7-tetramethyl-3,5,7-tripropylcyclotetrasiloxane is typical.

The compound of formula (1-2) has a polyorganosiloxy group, which may contain a siloxane group which is multibranched via a silethylene group.

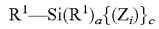  (1-2)

Herein $Z_i$ is a group of the formula:

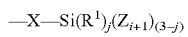

wherein i indicative of a hierarchy is an integer of 1 to 10, preferably 1 to 3, j is an integer of 0 to 3, j associated with at least one of all hierarchies is 0 or 1, the lowest hierarchy is j=3.

Examples of the compound of formula (1-2) wherein i=1 to 4 are shown below.

[Chem. 1]

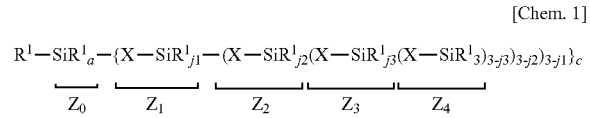

Herein $R^1$, X, a, c, and j are as defined above.

The foregoing compounds are exemplary of the isocyanide compound according to the invention while trimethylsilylmethyl isocyanide, bis(trimethylsilyl)methyl isocyanide, and tris(trimethylsilyl)methyl isocyanide may be excluded.

The isocyanide compound as component (D) may be synthesized by any well-known methods. One exemplary method is a method (synthesis method 1) of forming an isocyanide compound including the steps of combining an amine compound with formic acid to form a formyl compound and reacting the formyl compound with phosphoryl chloride in the presence of an organic amine (see Organometallics, 2004, 23, p 3976-3981). A method (synthesis method 2) of forming a formyl compound under mild conditions includes the steps of combining acetic anhydride with formic acid to form acetic/formic anhydride, and reacting the anhydride with an amine compound to form a formyl compound (see Org. Synth., 2013, 90, 358-366). The resulting formyl compound may be converted to an isocyanide compound by the same procedure as synthesis method 1. An alternative method (synthesis method 3) of forming a formyl compound includes the steps of combining a formamide with sodium hydride to form an anion, and reacting it with a halide compound to form a formyl compound (see Synthetic Communications, 1986, 16, p 865-869). The resulting formyl compound may be converted to an isocyanide compound by the same procedure as synthesis method 1.

Further, a formyl-bypassing method (synthesis method 4) is possible, which includes the step of reacting an amine compound with dichlorocarbene to form an isocyanide compound (see Tetrahedron Letters, 1972, 17, 1637-1640).

When the target isocyanide compound has a siloxane skeleton, it is desirably obtained by converting a commercially available amino-containing siloxane compound or an amino-containing siloxane compound obtained by the method of JP-A 2017-071581 to a formyl compound under mild conditions by synthesis method 2, and converting the product to an isocyanide form by synthesis method 1, or by synthesis method 4.

The amine compounds or halide compounds used herein may be compounds having the following formula (1'-1) or (1'-2).

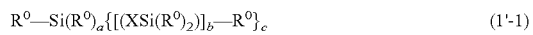  (1'-1)

  (1'-2)

Herein $Z^0_i$ is $-X-Si(R^0)_j(Z^0_{i+1})_{(3-j)}$, i indicative of a hierarchy is an integer of 1 to 10, preferably i=1 to 3, j is an integer of 0 to 3, j associated with at least one of all hierarchies is 0 or 1, the lowest hierarchy is j=3.

In formulae (1'-1) and (1'-2), $R^0$ is each independently a monovalent organic group selected from an optionally substituted $C_1$-$C_{30}$ monovalent organic group which may be separated by at least one atom selected from oxygen, nitrogen, sulfur and phosphorus, and an organic group having the formula (2'):

  (2'), one to three of all groups $R^0$ being an organic group of formula (2'), X is each independently an oxygen atom, or an optionally substituted $C_1$-$C_3$ divalent organic group which may be separated by at least one atom selected from oxygen, nitrogen, sulfur and phosphorus, two groups $R^1$ may bond together to form a crosslinking group Z to form a cyclic structure, wherein Z has the same meaning as X, Y is an optionally substituted $C_1$-$C_{30}$ divalent organic group which may be separated by at least one atom selected from oxygen, nitrogen, sulfur and phosphorus, G is $NH_2$ in the case of amine compounds, or halogen in the case of halide compounds, a, b and c are as defined above.

Below the conditions of synthesis from amine compound are outlined.

(i) Formylation by synthesis method 1; formylation is accomplished by adding an excess of formic acid to an amine compound and dehydrating under reflux.

(ii) Isocyanide formation of formyl compound by synthesis method 1; the desired compound is obtained by dissolving formyl compound and diisopropylamine in methylene chloride, cooling at 0° C., adding dropwise phosphoryl chloride, and stirring for further 2 hours, adding aqueous sodium carbonate solution, allowing to stand at room temperature overnight, and post-treatment. This is followed by distillation or sublimation for purification, if necessary.

(iii) Formylation by synthesis method 2; the desired compound is obtained by adding 2 equivalents of formic acid to 1 equivalent of acetic anhydride to form a formylating agent (acetic/formic anhydride), dissolving an amine compound in tetrahydrofuran (THF), cooling the solution at −15° C., adding dropwise the formylating agent to the solution such that the internal temperature may not exceed −5° C., stirring for further 2 hours, and post-treatment. This compound is converted to an isocyanide compound.

(iv) Isocyanide formation by synthesis method 4; the isocyanide compound is obtained by mixing an amine compound, chloroform, a phase transfer catalyst (benzyltriethylammonium chloride), and methylene chloride, adding 50 wt % sodium hydroxide aqueous solution to the mixture, stirring for 2 hours under reflux of methylene chloride, and post-treatment.

In the synthesis from a halide compound, formylation may be carried out by synthesis method 3 as shown below. Specifically, sodium hydride (60 wt % paraffin dispersion) is dispersed in dimethylformamide (DMF), formamide is added to the dispersion, which is stirred at 120° C. for 45 minutes. The reaction mixture is cooled at 60° C., a halide compound is added to the mixture, which is stirred at 120° C. for 24 hours. After the salt is filtered off, the solvent (DMF) is distilled off, obtaining a formyl compound. Subsequent isocyanide formation is the same as synthesis method 1.

As component (D), the compound having formula (1) may be used alone or in suitable combination of two or more. Component (D) may be a compound containing the compound having formula (1). For example, a solution prepared by mixing the compound having formula (1) with an organic solvent such as toluene, xylene or n-hexane may be used. Depending on the purpose or application, a small amount of a reaction inhibitor may be added. The reaction inhibitors include the compounds described above, for example, acetylene compounds, acetylene alcohol compounds, organic nitrogen compounds such as diamine, cyclic azo ether and imino compounds, organic sulfur compounds such as thiophene and thioether compounds.

The temperature and conditions under which the organopolysiloxane composition is cured may be adjusted by changing the amount of component (D) blended, depending on a particular application of the composition. The amount of component (D) blended is preferably to give 2 to 20 equivalents of organic groups (isocyanide groups) having formula (2) per platinum atom in component (C).

[Optional Components]

As long as the benefits of the invention are not compromised, components other than components (A) to (D) may be added to the inventive composition, depending on a particular purpose or application.

[Preparation Method]

The organopolysiloxane composition of the invention is obtained by blending components (A) to (D) and other components depending on a particular purpose.

Exemplary methods include a method of premixing components (C) and (D) to form a catalyst premix, and mixing the premix with other components; a method of mixing component (A), component (B) and other components, and adding the catalyst premix thereto; a method of premixing components exclusive of component (C), and adding component (C) thereto; and a method of premixing components exclusive of component (B), and mixing component (B) with the premix immediately before cure, as in the case of two pack type. Mixing is preferably continued until uniform. Of these, the method of premixing components (C) and (D) to form a catalyst premix is preferred. Although the technique of preparing the catalyst premix is not particularly limited, a solution of component (C) may be mixed with component (D). The mixing temperature is not particularly limited, and room temperature is acceptable. The mixing time is not particularly limited as long as two components are uniformly mixed.

[Curing Mode and Cured Product]

A cured product is obtainable from the organopolysiloxane composition by heating such that the isocyanide compound ceases to be effective and the platinum catalyst becomes active to promote addition reaction. The curing conditions which depend on the amount of component (D) added, include a heating temperature of 40 to 250° C. and a heating time of 1 minute to 1 hour, for example.

Also the organopolysiloxane composition may be cured by light irradiation. For example, a mercury lamp, LED or halide lamp may be used, the irradiation light is preferably UV in the wavelength range of 200 to 400 nm, and the irradiation time is preferably within 1 hour. Further, light irradiation may be combined with heating for curing.

EXAMPLES

Examples and Comparative Examples are given below for further illustrating the invention although the invention is not limited thereto. Me stands for methyl.

Synthesis Example 1

A 300-mL flask was charged with 57.1 g (0.56 mol) of acetic anhydride and cooled at an internal temperature of 5° C. To the flask, 51.5 g (1.12 mol) of formic acid was added dropwise. With the flask kept cool, stirring was continued for 30 minutes. The internal temperature was raised to 40° C., at which stirring was continued for 2 hours. The flask was cooled to room temperature, obtaining a reaction solution.

A 500-mL flask was charged with 106.0 g (0.30 mol) of 3-aminopropyl-tristrimethylsiloxysilane and 120.0 g of tetrahydrofuran (THF), and cooled at an internal temperature of −15° C. The reaction solution was added to the flask dropwise at such a rate that the internal temperature might not exceed −5° C. At the end of dropwise addition, stirring was continued at −15° C. for a further 2 hours. The volatile was removed by an evaporator, obtaining 118.2 g of a N-formylated crude product.

A 2-L flask was charged with 118.2 g of the N-formylated crude product, 120.0 g of methylene chloride, and 109.5 g (1.08 mol) of diisopropylamine, and cooled at an internal temperature of 5° C. To the flask, 52.3 g (0.34 mol) of phosphoryl chloride was added dropwise. With the flask kept cool, stirring was continued for 2 hours. 750.0 g of 20 wt % sodium carbonate aqueous solution was added dropwise such that the internal temperature might not exceed 20° C. At the end of dropwise addition, stirring was continued at room temperature for 15 hours. The formed salt was filtered off, and the water layer was separated. The organic layer was washed 3 times with water, dried over magnesium sulfate, filtered, and distilled, obtaining the target compound: $(Me_3SiO)_3SiCH_2CH_2CH_2NC$. Amount 62.7 g, yield 57.6%, b.p. 95.5-96.0° C./0.3 kPa, purity 99.6% by gas chromatography, odorless.

Synthesis Example 2

A 300-mL flask was charged with 26.5 g (0.26 mol) of acetic anhydride and cooled at an internal temperature of 5° C. To the flask, 23.9 g (0.52 mol) of formic acid was added dropwise. With the flask kept cool, stirring was continued for 30 minutes. The internal temperature was raised to 40° C., at which stirring was continued for 2 hours. The flask was cooled to room temperature, obtaining a reaction solution.

A 500-mL flask was charged with 65.4 g (0.14 mol) of $nBu(Me_2)SiO(Me_2SiO)_3Si(Me_2)CH_2CH_2CH_2NH_2$ and 100.0 g of THF, and cooled at an internal temperature of −15° C. The reaction solution was added to the flask dropwise at such a rate that the internal temperature might not exceed −5° C. At the end of dropwise addition, stirring was continued at −15° C. for a further 2 hours. The volatile was removed by an evaporator, obtaining 69.1 g of a N-formylated crude product.

A 1-L flask was charged with 69.1 g of the N-formylated crude product, 120.0 g of methylene chloride, and 49.3 g (0.49 mol) of diisopropylamine, and cooled at an internal temperature of 5° C. To the flask, 23.6 g (0.15 mol) of phosphoryl chloride was added dropwise. With the flask kept cool, stirring was continued for 2 hours. 350.0 g of 20 wt % sodium carbonate aqueous solution was added dropwise such that the internal temperature might not exceed 20° C. At the end of dropwise addition, stirring was continued at room temperature for 15 hours. The formed salt was filtered off, and the water layer was separated. The organic layer was washed 3 times with water, dried over magnesium sulfate, filtered, and distilled, obtaining the target compound: $nBu(Me_2)SiO(Me_2SiO)_3Si(Me_2)CH_2CH_2CH_2NC$. Amount 52.2 g, yield 77.8%, b.p. 145-147° C./0.3 kPa, purity 97.2% by gas chromatography, odorless.

Synthesis Example 3

A 300-mL flask was charged with 60.9 g (0.60 mol) of acetic anhydride and cooled at an internal temperature of 5°

C. To the flask, 55.0 g (1.20 mol) of formic acid was added dropwise. With the flask kept cool, stirring was continued for 30 minutes. The internal temperature was raised to 40° C., at which stirring was continued for 2 hours. The flask was cooled to room temperature, obtaining a reaction solution.

A 500-mL flask was charged with 135.6 g (0.32 mol) of 1,3,5,7-tetramethyl-3,5,7-tripropyl-3-aminopropylcyclotetrasiloxane and 200 mL of THF, and cooled at an internal temperature of −20° C. The reaction solution was added to the flask dropwise at such a rate that the internal temperature might not exceed −5° C. At the end of dropwise addition, stirring was continued at −15° C. for a further 2 hours. The volatile was removed by an evaporator, obtaining 145.7 g of a N-formylated crude product.

A 2-L flask was charged with 145.7 g of the N-formylated crude product, 200 mL of methylene chloride, and 113.1 g (1.12 mol) of diisopropylamine, and cooled at an internal temperature of 5° C. To the flask, 54.0 g (0.35 mol) of phosphoryl chloride was added dropwise. With the flask kept cool, stirring was continued for 2 hours. 802.0 g of 20 wt % sodium carbonate aqueous solution was added dropwise. At the end of dropwise addition, stirring was continued at room temperature for 15 hours. The formed salt was filtered off, and the water layer was separated. The organic layer was washed 3 times with water, dried over magnesium sulfate, filtered, and distilled, obtaining the target compound: 1,3,5,7-tetramethyl-3,5,7-tripropyl-3-isocyanopropylcyclotetrasiloxane. Amount 92.8 g, yield 67.0%, b.p. 132.0-133.5° C./0.3 kPa, purity 99.4% by gas chromatography, odorless.

Synthesis Example 4

A 100-mL flask was charged with 13.54 g (0.133 mol) of acetic anhydride and cooled at an internal temperature of −10° C. To the flask, 12.26 g (0.26 mol) of formic acid was added dropwise. With the flask kept cool, stirring was continued for 30 minutes. The internal temperature was raised to 40° C., at which stirring was continued for 3 hours. The flask was cooled to room temperature, obtaining a reaction solution.

A 200-mL flask was charged with 63.29 g (0.110 mol) of [(Me$_3$SiO)$_2$Si(Me)O]$_2$Si(Me)CH$_2$CH$_2$CH$_2$NH$_2$ and 100.0 g of THF, and cooled at an internal temperature of −20° C. The reaction solution was added to the flask dropwise at such a rate that the internal temperature might not exceed −5° C. At the end of dropwise addition, stirring was continued at −15° C. for a further 2 hours. The volatile was removed by an evaporator, obtaining 56.36 g of a N-formylated crude product.

A 100-mL flask was charged with 55.46 g of the N-formylated crude product, 151.6 g of methylene chloride, and 34.25 g (0.339 mol) of diisopropylamine, and cooled at an internal temperature of 5° C. To the flask, 19.84 g (0.130 mol) of phosphoryl chloride was added dropwise. With the flask kept cool, stirring was continued for 2 hours. 175.0 g of 20 wt % sodium carbonate aqueous solution was added dropwise. At the end of dropwise addition, stirring was continued at 5° C. for 1 hour. The formed salt was filtered off, and the water layer was separated. The organic layer was washed 3 times with water, dried over sodium sulfate, filtered, and distilled, obtaining the target compound: [(Me$_3$SiO)$_2$Si(Me)O]$_2$Si(Me)CH$_2$CH$_2$CH$_2$NC. Amount 36.75 g, yield 57.8%, b.p. 115° C./0.3 kPa, odorless.

Synthesis Example 5

A 300-mL flask was charged with 57.1 g (0.56 mol) of acetic anhydride and cooled at an internal temperature of 5° C. To the flask, 51.5 g (1.12 mol) of formic acid was added dropwise. With the flask kept cool, stirring was continued for 30 minutes. The internal temperature was raised to 40° C., at which stirring was continued for 2 hours. The flask was cooled to room temperature, obtaining a reaction solution.

A 500-mL flask was charged with 37.2 g (0.15 mol) of H$_2$NCH$_2$CH$_2$CH$_2$(Me$_2$)SiOSi(Me$_2$)CH$_2$CH$_2$CH$_2$NH$_2$ and 100.0 g of THF, and cooled at an internal temperature of −15° C. The reaction solution was added to the flask dropwise at such a rate that the internal temperature might not exceed −5° C. At the end of dropwise addition, stirring was continued at −15° C. for a further 2 hours. The volatile was removed by an evaporator, obtaining 46.7 g of a N-formylated crude product.

A 2-L flask was charged with 46.7 g of the N-formylated crude product, 120.0 g of methylene chloride, and 106.1 g (1.05 mol) of diisopropylamine, and cooled at an internal temperature of 5° C. To the flask, 50.7 g (0.33 mol) of phosphoryl chloride was added dropwise. With the flask kept cool, stirring was continued for 2 hours. 750.0 g of 20 wt % sodium carbonate aqueous solution was added dropwise such that the internal temperature might not exceed 20° C. At the end of dropwise addition, stirring was continued at room temperature for 15 hours. The formed salt was filtered off, and the water layer was separated. The organic layer was washed 3 times with water, dried over magnesium sulfate, filtered, and distilled, obtaining the target compound: CNCH$_2$CH$_2$CH$_2$(Me$_2$)SiOSi(Me$_2$)CH$_2$CH$_2$CH$_2$NC. Amount 17.4 g, yield 43.3%, b.p. 133-134° C./0.3 kPa, purity 97.8% by gas chromatography, faintly disgusting odor.

Example 1

A catalyst mixture was prepared by adding 1.9 mg of the isocyanide compound in Synthesis Example 1 to 100 mg of 0.5 wt % toluene solution of a platinum hydrosilylation catalyst which was the reaction product of chloroplatinic acid with tetramethyldivinylsiloxane, and stirring the mixture at room temperature for 1 hour.

A 100-mL separable flask was charged with 2.15 g of (B) both end trimethylsiloxy-capped methylhydrogenpolysiloxane (viscosity 20 mm$^2$/s) and 97.56 g of (A) both end dimethylvinylsiloxy-capped dimethylpolysiloxane (viscosity 381 mm$^2$/s), which were stirred at room temperature for 3 hours. 10.00 g of the mixture was combined with 0.02 g of the catalyst mixture and stirred at room temperature for 30 minutes. This mixture was a pale yellow clear solution. The solution was analyzed by a differential scanning calorimeter (DSC). The results are shown in Table 1.

Example 2

The same procedure and analysis as in Example 1 were carried out except that the amount (1.9 mg) of the isocyanide compound in Synthesis Example 1 was increased to 3.8 mg. The results are shown in Table 1.

Example 3

The same procedure and analysis as in Example 1 were carried out except that the amount (1.9 mg) of the isocyanide compound in Synthesis Example 1 was increased to 7.4 mg. The results are shown in Table 1.

Example 4

The same procedure and analysis as in Example 1 were carried out except that the amount (1.9 mg) of the isocyanide compound in Synthesis Example 1 was increased to 18.6 mg. The results are shown in Table 1.

TABLE 1

|  | Example 1 | Example 2 | Example 3 | Example 4 |
|---|---|---|---|---|
| Component (D) | Synthesis Example 1 | Synthesis Example 1 | Synthesis Example 1 | Synthesis Example 1 |
| ≡/Pt or —Y—CN/Pt | 2 | 4 | 8 | 20 |
| H/Vi molar ratio | 2.16 | 2.16 | 2.16 | 2.16 |
| Pt (ppm)/total of components (A) and (B) | 10 | 10 | 10 | 10 |
| DSC, peak top temperature (° C.) | 115 | 156 | 176 | 191 |

Example 5

A catalyst mixture was prepared by adding 0.187 g of the isocyanide compound in Synthesis Example 1 to 5.00 g of 0.5 wt % toluene solution of a platinum hydrosilylation catalyst which was the reaction product of chloroplatinic acid with tetramethyldivinylsiloxane, and stirring the mixture at room temperature for 1 hour.

A 500-mL separable flask was charged with 8.61 g of (B) both end trimethylsiloxy-capped methylhydrogenpolysiloxane and 390.24 g of (A) both end dimethylvinylsiloxy-capped dimethylpolysiloxane (both described in Example 1), which were stirred at room temperature for 12 hours. A 100-mL separable flask was charged with 10.00 g of the mixture and 0.2 g of the catalyst mixture, which were stirred at room temperature for 30 minutes. This mixture was a pale yellow clear solution. The pale yellow clear solution was subjected to DSC analysis and a 50° C. stability test (feeding 5 g of the solution in a 25-g vial, closing the vial, storing the solution at 50° C., and measuring the lapse of time from the start of storage until fluidity was lost, the same holds true, hereinafter). The results are shown in Table 2. Separately, an aliquot of the solution was placed in an aluminum dish and heated at 150° C. for 1 hour, obtaining a cured product.

Example 6

The same procedure and analysis as in Example 5 were carried out except that the amount (0.187 g) of the isocyanide compound in Synthesis Example 1 was increased to 0.372 g. The results are shown in Table 2.

Example 7

A catalyst mixture was prepared by adding 0.099 g of the isocyanide compound in Synthesis Example 2 to 2.00 g of 0.5 wt % toluene solution of the platinum catalyst described in Example 1, and stirring the mixture at room temperature for 1 hour.

Next, a 100-mL separable flask was charged with 10.00 g of a mixture of both end trimethylsiloxy-capped methylhydrogenpolysiloxane (8.61 g) and both end dimethylvinylsiloxy-capped dimethylpolysiloxane (390.24 g) (both described in Example 1), and 0.2 g of the catalyst mixture prepared in Example 5, which were stirred at room temperature for 30 minutes. This mixture was a pale yellow clear solution. The solution was analyzed by DSC and 50° C. stability test. The results are shown in Table 2. Separately an aliquot of the solution was placed in an aluminum dish and heated at 150° C. for 1 hour, obtaining a cured product.

Example 8

The same procedure and analysis as in Example 7 were carried out except that 0.089 g of the isocyanide compound in Synthesis Example 3 was used instead of the isocyanide compound in Synthesis Example 2. The results are shown in Table 2.

Example 9

The same procedure and analysis as in Example 7 were carried out except that 0.122 g of the isocyanide compound in Synthesis Example 4 was used instead of the isocyanide compound in Synthesis Example 2. The results are shown in Table 2.

Example 10

The same procedure and analysis as in Example 7 were carried out except that 0.027 g of the isocyanide compound in Synthesis Example 5 was used instead of the isocyanide compound in Synthesis Example 2. The results are shown in Table 2.

Comparative Example 1

A 100-mL separable flask was charged with 99.71 g of a mixture of (B) both end trimethylsiloxy-capped methylhydrogenpolysiloxane (8.61 g) and (A) both end dimethylvinylsiloxy-capped dimethylpolysiloxane (390.24 g) (both described in Example 1), and 0.29 g of 1-ethynyl-1-cyclohexanol, which were stirred at room temperature for 30 minutes. Thereafter, 0.20 g of the 0.5 wt % toluene solution of the platinum catalyst in Example 1 was added to the mixture, which was stirred for a further 1 hour. This mixture was a colorless clear solution. The solution was analyzed by DSC and 50° C. stability test. The results are shown in Table 2.

TABLE 2

|  | Example 5 | Example 6 | Example 7 | Example 8 | Example 9 | Example 10 | Comparative Example 1 |
|---|---|---|---|---|---|---|---|
| Component (D) | Synthesis Example 1 | Synthesis Example 1 | Synthesis Example 2 | Synthesis Example 3 | Synthesis Example 4 | Synthesis Example 5 | 1-ethynyl-1-cyclohexanol |
| ≡/Pt or —Y—CN/Pt | 4 | 8 | 4 | 4 | 4 | 4 | 45.5 |
| H/Vi molar ratio | 2.16 | 2.16 | 2.16 | 2.16 | 2.16 | 2.16 | 2.16 |
| Pt (ppm)/total of components (A) and (B) | 100 | 100 | 100 | 100 | 100 | 100 | 100 |
| Appearance | pale yellow clear | pale yellow clear | pale yellow clear | pale yellow clear | pale yellow clear | pale yellow clear | colorless clear |

TABLE 2-continued

| | Example 5 | Example 6 | Example 7 | Example 8 | Example 9 | Example 10 | Comparative Example 1 |
|---|---|---|---|---|---|---|---|
| DSC, peak top temperature (° C.) | 164 | 198 | 166 | 168 | 179 | 214 | 95<br>101 |
| Time until loss of fluidity at 50° C. | 16-19 hr | >21 days | 5-17 hr | 5-17 hr | 5-24 hr | 24 hr | 3-5 hr |

Example 11

The composition of Example 5 was cured with light irradiation and analyzed by a rheometer, using Discovery DHR of TA Instrument and Omnicure R2000 of Lumen Dynamics. Under conditions including a light dose of 42 mW/cm², the composition cured after 480 seconds.

Comparative Example 2

The composition of Comparative Example 1 was cured and analyzed under the same conditions as in Example 11. The composition remained uncured after 1,200 seconds of light irradiation.

Comparative Example 3

A catalyst was prepared by adding 0.012 g of t-butyl isocyanide (commercially available from Tokyo Chemical Industry Co., Ltd.) to 2.00 g of 0.5 wt % toluene solution of a platinum catalyst which was the reaction product of chloroplatinic acid with tetramethyldivinylsiloxane, and stirring the mixture at room temperature for 1 hour. The catalyst gave off a foul smell.

A 100-mL separable flask was charged with 5.00 g of a mixture of both end trimethylsiloxy-capped methylhydrogenpolysiloxane (8.61 g) and both end dimethylvinylsiloxy-capped dimethylpolysiloxane (390.24 g) (both described in Example 1), and 0.10 g of the catalyst, which were stirred at room temperature for 30 minutes. This mixture was a pale yellow clear solution. The mixture cured at room temperature within 30 minutes because the isocyanide compound was highly volatile.

Comparative Example 4

A catalyst mixture was prepared by adding 0.036 g of stearyl isocyanide which was synthesized from stearylamine (commercially available from Tokyo Chemical Industry Co., Ltd.) by the known method, to 2.00 g of 0.5 wt % toluene solution of a platinum catalyst which was the reaction product of chloroplatinic acid with tetramethyldivinylsiloxane, and stirring the mixture at room temperature for 1 hour. After 2 days, the catalyst mixture yielded a precipitate.

A 100-mL separable flask was charged with 5.00 g of a mixture of (B) both end trimethylsiloxy-capped methylhydrogenpolysiloxane (8.61 g) and (A) both end dimethylvinylsiloxy-capped dimethylpolysiloxane (390.24 g) (both described in Example 1), and 0.10 g of the catalyst, which were stirred at room temperature for 30 minutes. This mixture was faintly turbid.

As seen from the results of DSC in Examples and Comparative Examples 1 and 2, the inventive component (D) serves as an inhibitor to platinum, and the amount of this inhibitor is smaller than that of acetylene alcohol base inhibitors. The inventive component (D) gives off no or little foul smell inherent to isocyanide compounds, and is low volatile and fully dissolvable in silicone compositions. The silicone compositions having the inventive component (D) blended therein are fully stable at 50° C.

By contrast, Comparative Example 3 demonstrated highly volatile component (D) and insufficient reaction control. Comparative Example 4 demonstrated difficulty soluble component (D) and catalyst precipitation.

The invention claimed is:

1. An organopolysiloxane composition comprising:
   (A) an organopolysiloxane having at least two silicon-bonded alkenyl groups per molecule,
   (B) an organohydrogenpolysiloxane having at least two silicon-bonded hydrogen atoms per molecule,
   (C) a platinum hydrosilylation catalyst, and
   (D) a compound having the formula (1-1) or (1-2):

$$R^1\text{—Si}(R^1)_a\{[X\text{—Si}(R^1)_2]_b\text{—}R^1\}_c \quad (1\text{-}1)$$

$$R^1\text{—Si}(R^1)_a\{(Z_i)\}_c \quad (1\text{-}2)$$

wherein $R^1$ is each independently a monovalent organic group selected from an optionally substituted $C_1$-$C_{30}$ monovalent organic group which may be separated by at least one atom selected from oxygen, nitrogen, sulfur and phosphorus, and an organic group having the formula (2):

$$\text{—Y—NC} \quad (2)$$

wherein Y is an optionally substituted $C_1$-$C_{30}$ divalent organic group which may be separated by at least one atom selected from oxygen, nitrogen, sulfur and phosphorus, one to three of all groups $R^1$ being an organic group of formula (2), X is each independently an oxygen atom, or an optionally substituted $C_1$-$C_{30}$ divalent organic group which may be separated by at least one atom selected from oxygen, nitrogen, sulfur and phosphorus, a is an integer of 0 to 3, c is an integer of 0 to 3, a+c is 3, b is an integer of 1 to 300, $Z_i$ is a group of the formula:

$$\text{—X—Si}(R^1)_j(Z_{i+1})_{(3-j)}$$

wherein i indicative of a hierarchy is an integer of 1 to 10, j is an integer of 0 to 3, j associated with at least one of all hierarchies is 0 or 1, the lowest hierarchy is j=3, or a cyclic polysiloxane compound in which a cyclic structure is formed of repeating unit of —OSi$(R^1)_2$—, wherein $R^1$ is as defined above.

2. The organopolysiloxane composition of claim 1 wherein component (A) is an organopolysiloxane having the average compositional formula (3):

$$R^2_d R^3_e \text{SiO}_{(4-d-e)/2} \quad (3)$$

wherein $R^2$ is each independently an alkenyl group, $R^3$ is each independently a silicon-bonded organic group other than the alkenyl group, d and e are numbers in the range: 0<d≤3, 0≤e<3, and 0<d+e≤3, and selected such that at least two alkenyl groups $R^2$ are contained per molecule, and component (B) is an organohydrogenpolysiloxane having the average compositional formula (4):

(4)

wherein $R^4$ is each independently an organic group other than silicon-bonded hydrogen, g and h are numbers in the range: 0<g<3, 0<h<3, and 0<g+h≤3, and selected such that at least two silicon-bonded hydrogen atoms are contained per molecule.

3. The organopolysiloxane composition of claim 1 wherein in formula (1-1), a is 0, 1 or 2.

4. The organopolysiloxane composition of claim 1 wherein in formula (1-1) or (1-2), or the repeating unit of —OSi($R^1$)$_2$— of the cyclic polysiloxane compound, one of all groups $R^1$ is an organic group of formula (2).

5. The organopolysiloxane composition of claim 1 wherein in formula (1-1) or (1-2), X is oxygen.

6. The organopolysiloxane composition of claim 1 wherein in formula (2), Y is a $C_1$-$C_{30}$ divalent hydrocarbon group.

7. The organopolysiloxane composition of claim 1 wherein component (D) is present in an amount to give 2 to 20 equivalents of the group of formula (2) per platinum atom in component (C).

8. The organopolysiloxane composition of claim 1 wherein in formula (1-1) or (1-2), or the repeating unit of —OSi($R^1$)$_2$— of the cyclic polysiloxane compound, $R^1$ is each independently a monovalent organic group selected from $C_1$-$C_{30}$ alkyl groups, $C_2$-$C_{20}$ alkenyl groups, $C_2$-$C_{20}$ alkynyl groups, $C_6$-$C_{30}$ aryl groups, $C_7$-$C_{30}$ aralkyl groups, $C_1$-$C_{30}$ alkoxy groups and an organic group having the formula (2):

(2)

wherein Y is a $C_1$-$C_{30}$ alkylene group which may be straight, branched or cyclic, a $C_6$-$C_{30}$ arylene group, or a $C_7$-$C_{30}$ aralkylene group.

9. The organopolysiloxane composition of claim 1 wherein in formula (1-1), X is each independently an oxygen atom, a $C_1$-$C_{30}$ alkylene group, a $C_6$-$C_{30}$ arylene group, or a $C_7$-$C_{30}$ aralkylene group.

* * * * *